United States Patent
Beardslee et al.

(10) Patent No.: US 12,066,404 B2
(45) Date of Patent: Aug. 20, 2024

(54) CHEMICAL SENSING SYSTEMS AND METHODS

(71) Applicant: Georgia Tech Research Corporation, Atlanta, GA (US)

(72) Inventors: Luke Armitage Beardslee, Atlanta, GA (US); Oliver Brand, Atlanta, GA (US); Kemal Safak Demirci, Atlanta, GA (US); Jae Hyeong Seo, Atlanta, GA (US); Steven Andrew Schwartz, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/205,912

(22) Filed: Jun. 5, 2023

(65) Prior Publication Data

US 2023/0324340 A1    Oct. 12, 2023

Related U.S. Application Data

(63) Continuation of application No. 17/772,802, filed as application No. PCT/US2020/057724 on Oct. 28, 2020.

(Continued)

(51) Int. Cl.
*G01N 29/02* (2006.01)
*G01N 27/22* (2006.01)
*G01N 29/036* (2006.01)

(52) U.S. Cl.
CPC ......... *G01N 29/022* (2013.01); *G01N 27/221* (2013.01); *G01N 27/227* (2013.01); *G01N 29/036* (2013.01); *G01N 2291/022* (2013.01)

(58) Field of Classification Search
CPC .. G01N 29/022; G01N 27/221; G01N 27/227; G01N 29/036; G01N 2291/022;
(Continued)

(56) References Cited

U.S. PATENT DOCUMENTS 6,994,777 B2    2/2006    Gonzalez-Martin et al.
8,336,373 B2    12/2012   Kown
(Continued)

OTHER PUBLICATIONS

International Search Report and Written Opinion from Application No. PCT/US2020/057724 dated Feb. 5, 2021.

*Primary Examiner* — Tarun Sinha
(74) *Attorney, Agent, or Firm* — Troutman Pepper Hamilton Sanders LLP; Ryan A. Schneider; Dustin B. Weeks

(57) ABSTRACT

Disclosed herein is a chemical sensing system, comprising: a sensor configured to adsorb an analyte; an electronic circuit to operate the sensor; and a microcontroller in communication with the sensor and the electronic circuit. The microcontroller can also be configured to provide a real-time signal indicative of a concentration of the analyte. The sensor can comprise a microelectromechanical system (MEMS) resonator and a sensing film configured to adsorb the analyte, the sensing film coating at least a portion of the sensor. The MEMS resonator can comprise a second sensor, such as an impedimetric sensor to measure at least a second property of the sensing film. The electronic circuit can process signals stemming from at least two properties of the same sensing film, such as the changes in mass and dielectric constant of the same sensing film due to adsorption of analyte.

20 Claims, 12 Drawing Sheets

Related U.S. Application Data

(60) Provisional application No. 63/348,704, filed on Jun. 3, 2022, provisional application No. 62/926,811, filed on Oct. 28, 2019.

(58) Field of Classification Search
CPC ... G01N 2291/0255; G01N 2291/0256; G01N 2291/0427
See application file for complete search history.

(56) References Cited

U.S. PATENT DOCUMENTS

| | | |
|---|---|---|
| 8,448,494 B2 | 5/2013 | Mastromatteo et al. |
| 8,736,000 B1 * | 5/2014 | Manginell ............ G01N 27/221 |
| | | 257/E27.048 |
| 9,861,151 B2 | 1/2018 | Ciaramelletti et al. |
| 2010/0000292 A1 * | 1/2010 | Karabacak ........... G01N 29/022 |
| | | 73/24.01 |
| 2010/0207602 A1 | 8/2010 | Loverich |
| 2015/0276405 A1 | 10/2015 | Rastegar |
| 2016/0041138 A1 | 2/2016 | Pycke |
| 2016/0161434 A1 | 6/2016 | Yan |
| 2018/0275276 A1 | 9/2018 | Ngal et al. |
| 2019/0234907 A1 | 8/2019 | Edwards et al. |
| 2020/0249190 A1 * | 8/2020 | Hauser ................. G01N 27/026 |

* cited by examiner

CHEMICAL SENSING SYSTEMS AND METHODS

CROSS-REFERENCE TO RELATED APPLICATIONS

This application is a continuation of, and claims the benefit of U.S. Nonprovisional application Ser. No. 17/772,802, filed on 28 Apr. 2022, which claims the benefit of PCT Application Serial No. PCT/US2020/057724, filed on 28 Oct. 2020, which claims the benefit of U.S. Provisional Application Ser. No. 62/926,811, filed on 28 Oct. 2019, and the entire contents and substance of each are incorporated herein by reference in its entirety as if fully set forth below. This application further claims the benefit of U.S. Provisional Application Ser. No. 63/348,704, filed on 3 Jun. 2022, the entire contents and substance of which is incorporated herein by reference in its entirety as if fully set forth below.

STATEMENT OF RIGHTS UNDER FEDERALLY SPONSORED RESEARCH

This invention was made with government support under N62645-18-D-5049 awarded by the Department of Defense Navy Medical Logistics Command. The government has certain rights in the invention.

FIELD OF THE DISCLOSURE

The present disclosure relates generally to chemical sensing systems and methods. Particularly, embodiments of the present disclosure relate to micromachined chemical multi-sensors.

BACKGROUND

A growing and more connected world has created numerous opportunities for chemical sensing in a range of areas including environmental monitoring, exposure threshold monitoring, threat detection, medical applications, and the like. For many of these applications, the gold standard solution has been to collect samples in the field and send them to an analytical lab for analysis using gas chromatography and mass spectrometry (GC-MS). While these analytical methods are selective and highly sensitive, they are expensive, time-consuming, and do not occur in real-time; in fact, this approach creates a large supply chain in terms of transporting sampling devices into the field and then back to the laboratory for analysis.

However, environmental monitoring, chemical threshold monitoring, threat detection, and even medical diagnostics are all areas that potentially require large numbers and even networks of sensors that provide real-time data to their users. For such applications, batch-fabricated microsensors based on microelectromechanical systems (MEMS) technologies are appealing because these sensors can be fabricated inexpensively in large numbers and can be readily integrated with existing processes used to fabricated integrated circuits. Generally, these chemical microsensors do not come close to the sensitivity, stability, and particularly selectivity achieved with laboratory-based GC-MS equipment, but they offer small size, low cost, in-field usability and real-time data, all of which are key requirements for many sensing scenarios.

What is needed, therefore, are improved chemical sensing systems and methods that offer improved sensitivity, selectivity, and cost of manufacturing. Embodiments of the present disclosure address this need as well as other needs that will become apparent upon reading the description below in conjunction with the drawings.

BRIEF SUMMARY OF THE DISCLOSURE

The present disclosure relates generally to chemical sensing systems and methods. Particularly, embodiments of the present disclosure relate to micromachined chemical multi-sensors.

An exemplary embodiment of the present disclosure can provide a chemical sensing system, comprising: a sensor configured to ab/adsorb an analyte; an electronic circuit to operate the sensor; and a microcontroller in communication with the sensor and the electronic circuit, the micro controller configured to control the chemical sensing system and process data received from the sensor, wherein the microcontroller is configured to provide a real-time signal indicative of a concentration of the analyte.

In any of the embodiments disclosed herein, the sensor can comprise a microelectromechanical system (MEMS) resonator and a sensing film configured to ab/adsorb the analyte, the sensing film coating at least a portion of the sensor.

In any of the embodiments disclosed herein, the MEMS resonator can comprise: a semicircular annulus coated with the sensing film; and a cantilever stem supporting the semicircular annulus, the cantilever stem in communication with the circuit, wherein adsorption of the analyte on the sensing film causes the change in a resonant frequency of the sensor.

In any of the embodiments disclosed herein, a second MEMS sensor can be directly integrated onto the MEMS resonator to sense at least two properties of the same sensing film.

In any of the embodiments disclosed herein, the second MEMS sensor can be an impedimetric sensor measuring the impedance change of the sensing film when analyte is ab/adsorbed.

In any of the embodiments disclosed herein, the impedimetric sensor can be an interdigitated electrode structure integrated on the semicircular annulus.

In any of the embodiments disclosed herein, the electronic circuit can operate both the MEMS resonator and the impedimetric sensor.

In any of the embodiments disclosed herein, the electronic circuit can comprise an oscillator circuit feedback loop to operate the MEMS resonator.

In any of the embodiments disclosed herein, the electronic circuit can process signals stemming from at least two properties of the same sensing film.

In any of the embodiments disclosed herein, the at least two properties can be the changes in mass and dielectric constant of the same sensing film due to ab/adsorption of analyte.

In any of the embodiments disclosed herein, the sensing film can comprise a polymeric material.

In any of the embodiments disclosed herein, the MEMS resonator can comprise a silicon substrate layer, a silicon oxide layer disposed on the substrate layer, a diffused resistor in the substrate layer, and a passivation layer coating the silicon oxide layer, the substrate layer, and the resistor layer.

In any of the embodiments disclosed herein, ab/adsorption of the analyte on the sensor can cause more than one property change of the sensor, wherein the microcontroller is further configured to produce more than one real-time signal indicative of the concentration of the analyte.

In any of the embodiments disclosed herein, the electronic circuit can comprise an operational amplifier, a differential amplifier, and a phase shifter.

In any of the embodiments disclosed herein, the microcontroller can include a field programmable gate array (FPGA) implementing a digital counter.

In any of the embodiments disclosed herein, the microcontroller can include a field programmable gate array (FPGA).

In any of the embodiments disclosed herein, the sensor can comprise two or more microelectromechanical system (MEMS) resonators, each of the two or more MEMS resonators coated with a different sensing film, each of the sensing films configured to ab/adsorb the analyte.

In any of the embodiments disclosed herein, the system is configured to determine a chemical composition of the analyte based on properties detected by the sensor.

In any of the embodiments disclosed herein, the system can further comprise a wearable housing configured to contain the sensor, the circuit, and the microcontroller, the wearable housing configured to attach to an article of clothing.

Another embodiment of the present disclosure can provide a method of detecting an unknown analyte, the method comprising: contacting the unknown analyte with a sensor in communication with a circuit and a microcontroller; adsorbing the unknown analyte on the sensor, the unknown analyte causing (i) a change in a resonant frequency of the sensor and (ii) a change in dielectric properties of the sensor; generating, in response to the change in the resonant frequency and the change in dielectric properties, a real-time signal using the microcontroller, the real-time signal indicative of one or more characteristics of the unknown analyte; and determining a chemical composition and a concentration of the unknown analyte based on the one or more characteristics.

In any of the embodiments disclosed herein, the sensor can comprise a microelectromechanical system (MEMS) resonator and a sensing film configured to ab/adsorb the analyte, the sensing film coating at least a portion of the sensor.

In any of the embodiments disclosed herein, the MEMS resonator can comprise a silicon substrate layer, a silicon oxide layer disposed on the substrate layer, a resistor layer diffused into the substrate layer, and a passivation layer coating the silicon oxide layer, the substrate layer, and the resistor layer.

In any of the embodiments disclosed herein, the MEMS resonator can comprise: a semicircular annulus coated with the sensing film; and a cantilever stem supporting the semicircular annulus, the cantilever stem in communication with the circuit.

In any of the embodiments disclosed herein, the method can further comprise: measuring, by the sensor, the mass properties and the dielectric properties of the unknown analyte.

In any of the embodiments disclosed herein, the circuit can comprise an oscillator circuit feedback loop to operate the sensor.

In any of the embodiments disclosed herein, the oscillator circuit feedback loop can comprise an operational amplifier, a differential amplifier, and a phase shifter.

In any of the embodiments disclosed herein, the microcontroller can include a field programmable gate array (FPGA) emulating a digital counter in communication with the circuit.

In any of the embodiments disclosed herein, the microcontroller can include a field programmable gate array (FPGA).

In any of the embodiments disclosed herein, the sensor can comprise two or more microelectromechanical system (MEMS) resonators, each of the two or more MEMS resonators coated with a different sensing film, each of the sensing films configured to ab/adsorb the analyte.

In any of the embodiments disclosed herein, the sensor further can further comprise a wearable housing configured to contain the sensor, the circuit, and the microcontroller, the wearable housing configured to attach to an article of clothing.

These and other aspects of the present disclosure are described in the Detailed Description below and the accompanying figures. Other aspects and features of embodiments of the present disclosure will become apparent to those of ordinary skill in the art upon reviewing the following description of specific, exemplary embodiments of the present invention in concert with the figures. While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present disclosure.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Disclosed herein are novel microfabricated multisensors that can enable simultaneous measurement of mass and dielectric property changes in the same sensing film. A multisensor is understood to be a multivariate sensor. This can be done by collocating two transducers on a single device, schematically represented in FIG. 1. This approach can save space on the chip and allow researchers to simultaneously probe multiple properties, of varying domain, from a single sensing film. By decreasing the correlation between the transducer responses, i.e. increasing the orthogonality of the sensor responses, the selectivity of the sensing system can be improved. Moreover, uncorrelated drift due to the difference in aging of multiple sensing films in an array is potentially minimized by reducing the system to a single sensing film with two collocated transducers.

Figure 1:
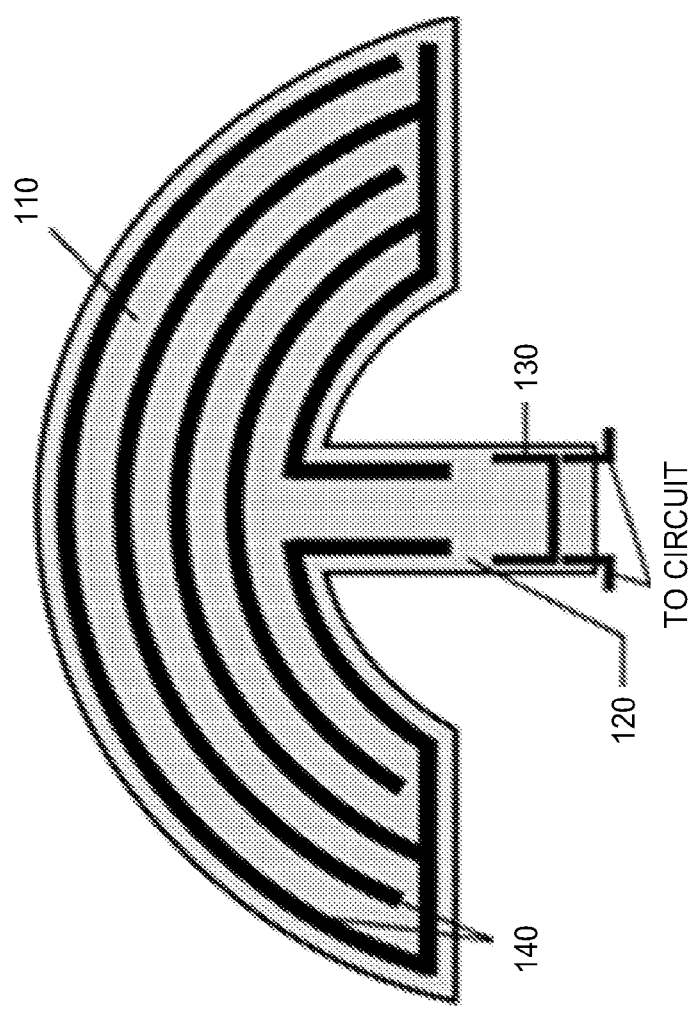
FIG. 1 illustrates a top-down view of a chemical sensor according to some examples of the present disclosure.

The wearable chemical sensing systems described in the present disclosure can comprise three major electronic components: the MEMS resonator, which is the actual sensing element/transducer as shown in FIG. 1, the circuit to operate the resonator, and the back end electronics, which process and log the data. Each of these elements are also described herein in a wearable sensing system utilizing the hammerhead resonators.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

As used herein, the term "analyte" can refer to any particle and/or molecule of a chemical compound or element. The analytes described herein are described with respect to being in the gaseous or liquid phase, but it is understood that the present disclosure does not preclude an analyte from being in any other phase of matter, such as solid, plasma, and the like.

As used herein, the terms "electric communication" or "electrical communication" can refer to any pathway through which a plurality of electrons can flow. In other words, two objects can be in electric communication when electrons can flow from one object to the other, including with the assistance of an outside force.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

FIG. 1 illustrates a sensor 100 in the form of a microelectromechanical system (MEMS) resonator. The MEMS resonator can be a "hammerhead" resonator, comprising a semicircular annulus 110 and a cantilever stem 120 supporting the semicircular annulus 110. A cross-sectional view of the MEMS resonator is shown in greater detail in FIG. 2. The chosen "hammerhead" design with a large head region supported by a cantilever is particularly appropriate for chemical sensing as it can enable the large head region to be coated with a variety of sensing materials, while being decoupled from the cantilever segment in which a majority of the deformation occurs. As would be appreciated, such a design can mitigate the effects of viscoelastic damping associated with any coatings and/or any films and can ensure high-Q operation. Therefore, the hammerhead design can provide excellent frequency stability even with a coating and/or a film. In addition, the large head region can provide ample space to accommodate the capacitive sensor or other secondary sensing elements.

For the detection of gaseous chemical contaminants, at least a portion of the hammerhead resonators can be coated with a polymer (or another coating), which can absorbs/adsorbs an analyte from the environment. The analytes that can be adsorbed by the resonator can include, for example, volatile organic compounds (VOCs), toxic gases, carcinogens, biomolecules and the like.

The chemicals that are loaded onto the sensitive film of the MEMS resonator can increase the mass of the resonator. The resonator itself is a second order system, where the frequency of the resonator's vibration can be dependent on both its mass and stiffness. Without wishing to be bound by any particular scientific theory, the increase in mass caused by the chemical loading in the sensitive film on the surface of the resonator can cause the resonant frequency of the hammerhead to drop. Thus, by tracking the resonator's resonant frequency, the chemical sensing systems disclosed herein can track the response of the sensor 100 to chemicals or other biological agents present in the surroundings.

The hammerhead resonator can utilize thermal excitation and piezoresistive detection to excite and sense the first in-plane flexural mode. Thermal actuation and piezoresistive detection can both rely on resistors as transduction elements, which can be straightforward to integrate with current silicon-based bulk-micromachining processes. In order to reject common mode signals and also possible signals from unwanted modes, the piezoresistors can be arranged in a Wheatstone bridge configuration 130, as shown in FIG. 1. The U-shaped Wheatstone bridge 130 can promote signals stemming from the desired in-plane vibration mode, but (to a first order approximation) can also reject signals from out-of-plane and torsional modes due to the resistor arrangement and characteristic stress distribution of the different modes. The sensor 100 can also include interdigitated electrodes 140, as will be described in further detail below.

Figure 2:
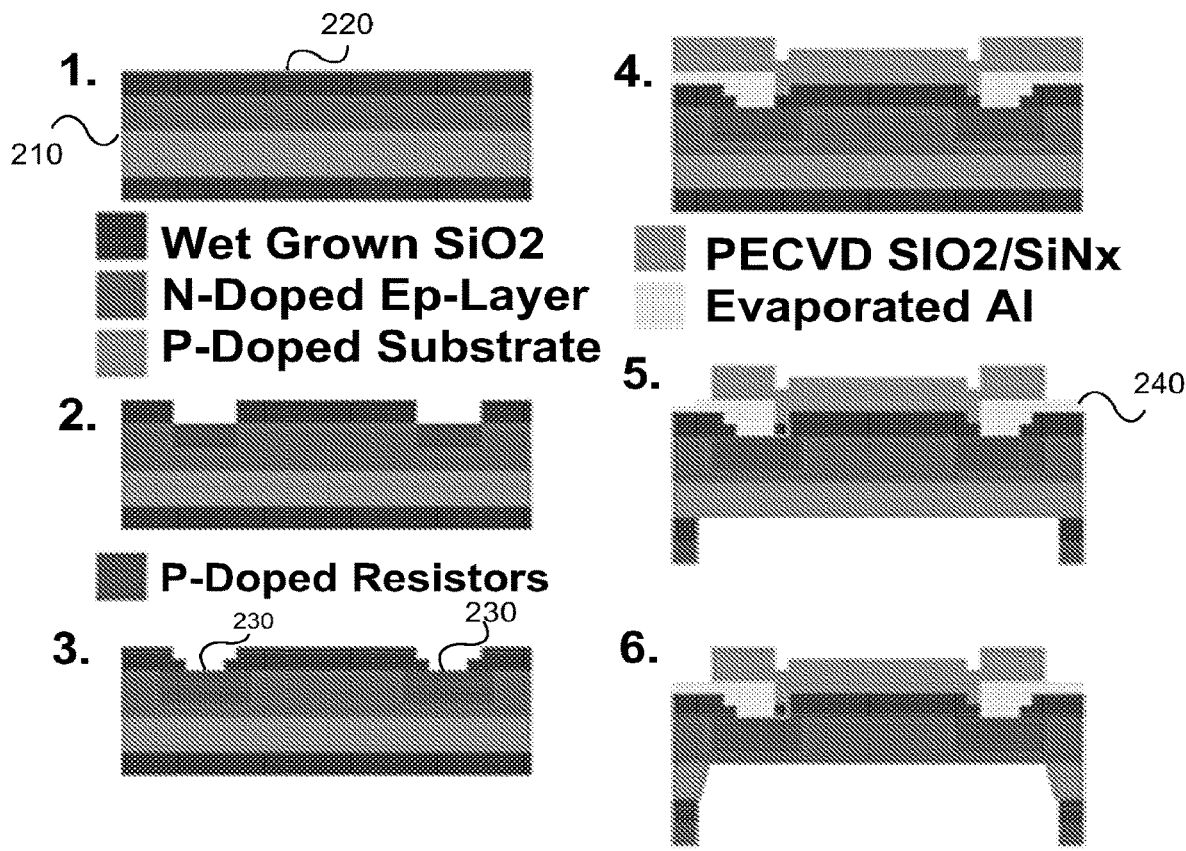
FIG. 2 illustrates a cross-sectional view of the fabrication process of a chemical sensor according to some examples of the present disclosure.

As shown in FIG. 2, some or all of the MEMS resonator can comprise a silicon substrate layer 210, a silicon oxide layer 220 disposed on the substrate layer 210, a resistor layer 230 diffused into the substrate layer 210, and a passivation layer 240 coating the silicon oxide layer 220, the substrate layer 210, and the resistor layer 230. While many similar devices can be based on silicon or related materials, such as $SiO_2$ and $SiN_x$, alternative materials are considered to be within the scope of the present disclosure, including polymers, such as SU-8, and diamond for chemical sensing applications.

Adsorption of the analyte on the polymeric sensing film can also cause a change in dielectric properties of the sensing film itself 100. These changes in dielectric properties can be detected by a set of interdigitated electrodes, which are fabricated on the surface of the resonator itself. These electrodes can be interrogated by a separate electrical circuit, which can potentially be interrogated by either an FPGA or a microcontroller.

Figure 3:
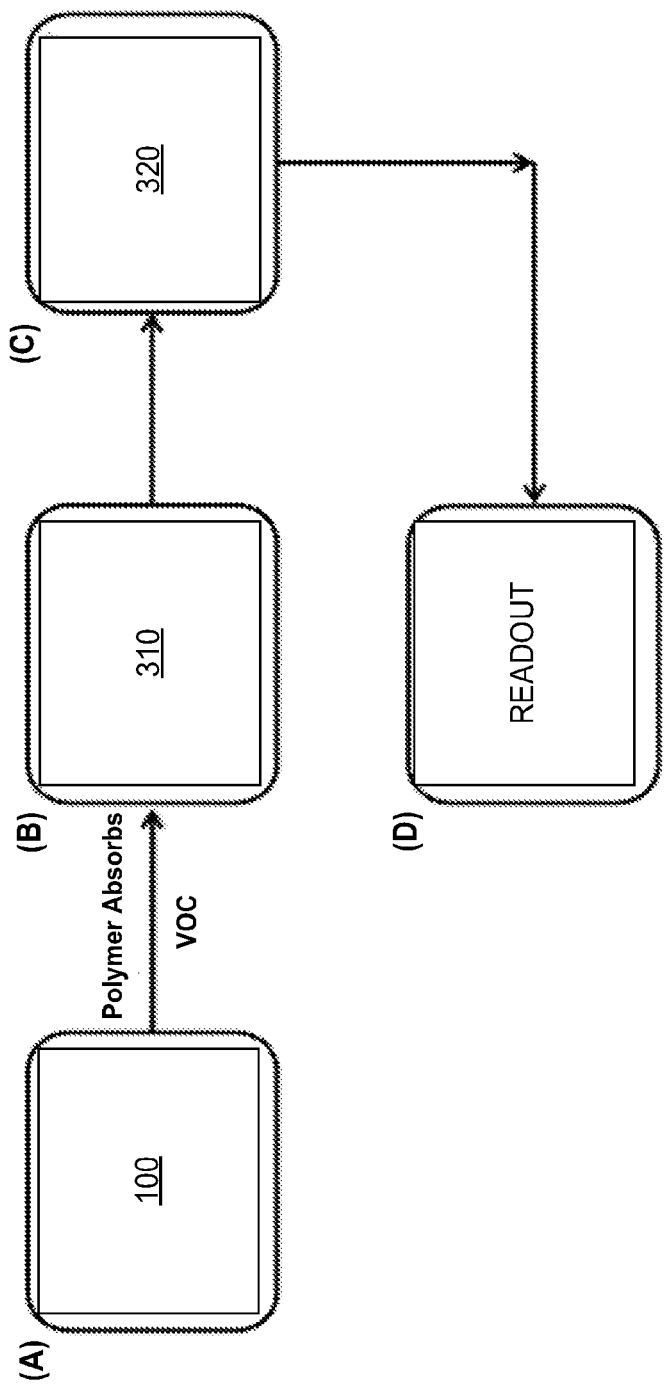
FIG. 3 illustrates a component diagram of a chemical sensing system according to some examples of the present disclosure.

FIG. 3 illustrates a component diagram of a wearable chemical sensing system 300 using the sensor 100 described in FIGS. 1 and 2. The system 300 can comprise the sensor 100, a circuit 310 in electrical communication with the sensor 100, and a microcontroller 320, which can be complemented by a field programmable gate array (FPGA) to program certain functions such as digital counter, in electrical communication with the circuit. The adsorption of the analyte onto the sensor 100 can cause a change in a resonant frequency of the sensor and the circuit, as described above. In response, the digital counter on the FPGA can be configured to produce a real-time signal according to the change in the resonant frequency indicative of one or more characteristics of the analyte. Interdigitated electrodes can be microfabricated onto the surface of the resonator with minimal modification of the microfabrication process. These electrodes can be combined with circuity capable of reading a capacitive or impedimetric response. The FPGA or the microcontroller core can produce a second real-time signal in response to a change in the dielectric properties of the sensor 100 by interrogating the appropriate on-board electronics. Combining both real-time signals received in response to the change in resonant frequency and change in dielectric properties of the sensor 100 can aid in determining the one or more characteristics of the analyte.

To create the system 300, it is desirable to continuously operate the sensor 100 (e.g., the hammerhead resonator) because this allows continual tracking of the sensor signal in real-time. This can allow the system 300 to attribute a change in sensor output to either drift or actual analyte detection. Continuous operation is accomplished using an amplifying feedback loop within the circuit 310. To obtain self-sustaining oscillations, Barkhausen's criterion must be met. Mainly, 360 degrees of phase-shift around the loop and a gain of 1 must be provided by the combination of the sensor 100 and the closed-loop circuit 310. The circuit 310 can be miniaturized and ported to a fully embedded format where the circuit 310 can operate the sensor 100 from a power source for extended periods of time. This can be accomplished using carefully chosen amplifiers. The circuit 310 feedback loop can comprise, for example, an operational amplifier, a differential amplifier, and a phase shifter. The lower power/lower footprint amplifying feedback loop can be incorporated into a custom circuit board design with the goal of a smaller footprint and longer battery life without large compromises in performance.

An embedded digital counter can be used on a field programmable gate array (FPGA). The counter can be included in the design to track the sensor signal. A microcontroller core on the FPGA chip can further process the data and write the data to onboard memory for storage.

The system 300 can include two or more instances of the sensor 100. Each of the multiple sensors can be coated with a different coating (e.g., a different polymeric film). In such a manner, the multiple sensors can be capable of sensing concentrations of multiple chemicals or analytes. Alternatively, or additionally, the multiple sensors coated with different coatings can include multiple sensing principles (e.g., mass and dielectric sensing) to sense multiple aspects of one analyte.

The system 300 can utilize the real-time signals to produce an identity (e.g., a chemical composition of the analyte) and the concentration of the identity. To do so, the real-time signals can be indicative of one or more characteristics of the analyte. If more than one sensor 100 is used, the different sensors can each produce a different signal indicative of a different characteristic. In such a manner, the system can piece together the different characteristics of the analyte to determine the identity of the analyte. The characteristics of the analyte can include, for example, a chemical structure, a chemical composition, an isomeric indicator, a chirality, a functional group, and the like. In such a manner, the sensor 100 (or multiple sensors) can create a "fingerprint" of the analyte to determine the identity of the analyte.

The system 300 can also include a processor and a memory for executing some or all of the steps described herein. While the following methods are described in relation to the system 300, it is understood that some or all steps of the method can be performed by other systems not disclosed herein.

Figure 4:
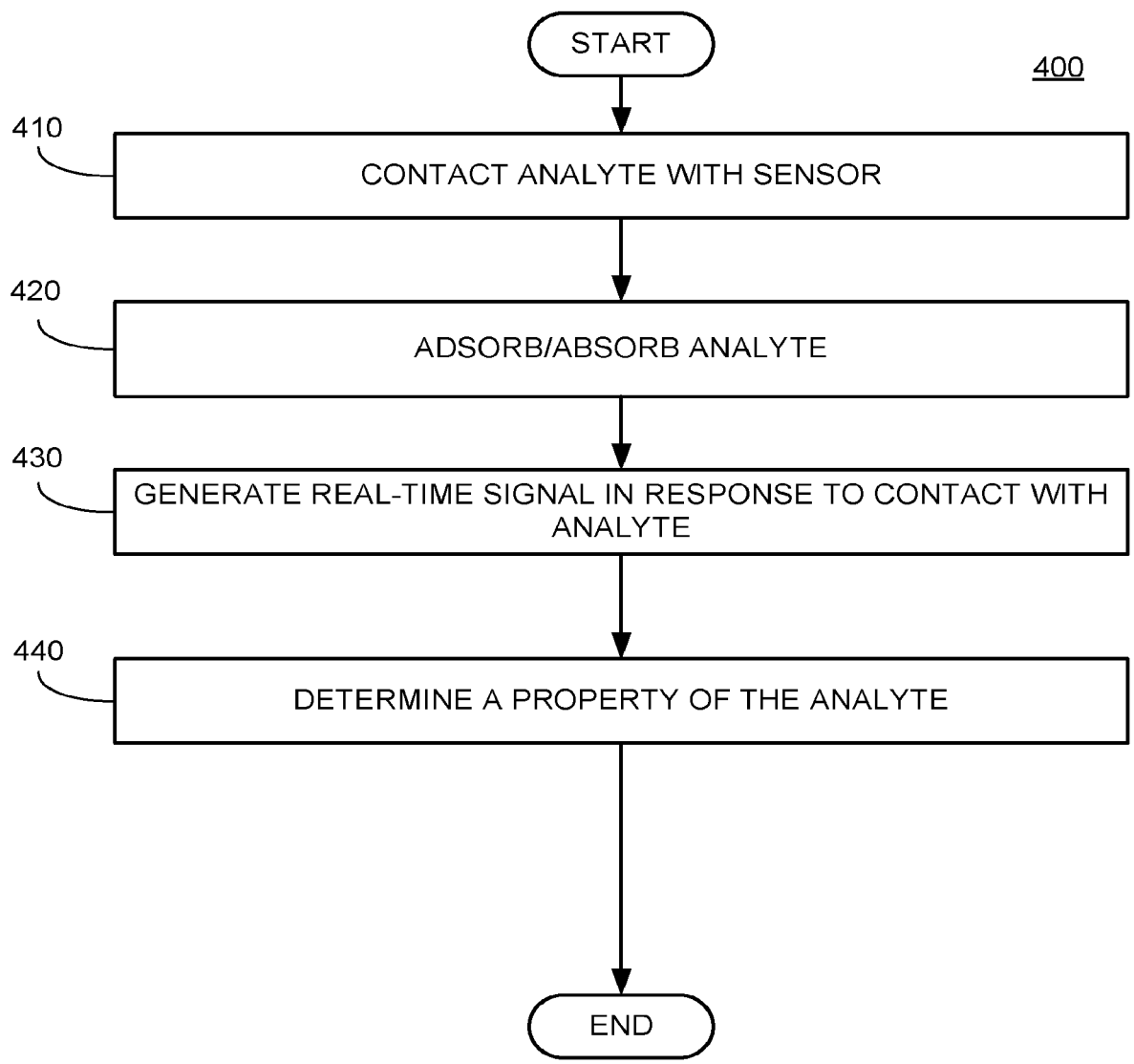
FIG. 4 illustrates a flowchart of a method of detecting an unknown analyte according to some examples of the present disclosure.

FIG. 4 illustrates a flowchart of an example method 400 of detecting an unknown analyte. While the method 400 is described with respect to the system 300, it is understood that the method 400 can be performed by other systems not shown and described herein.

In block 410, the unknown analyte can be contacted with the sensor 100. The sensor 100 can be in communication with the circuit 310 and the microcontroller 320. The unknown analyte can be adsorbed or absorbed onto the surface of the sensor 100. The method 400 can then proceed on to block 420.

In block 420, adsorbing/absorbing the unknown analyte onto the sensor 100 can cause a change in the resonant frequency of the sensor 100 and a change in the dielectric properties of the sensor 100. As described above, the mass of the analyte increases the mass of the sensor, altering the resonant frequency. The method 400 can then proceed on to block 430.

In block 430, in response to the changes in resonant frequency and dielectric properties, the microcontroller 320 (or other components of the system 300) can generate a real-time signal indicative of one or more characteristics of the unknown analyte. The characteristic can include, for example, a chemical structure, a chemical composition, an isomeric indicator, a chirality, a functional group, and the like. The method 400 can then proceed on to block 440.

In block 440, the system 300 can determine a property of the unknown analyte, such as a concentration, the chemical composition, or identity, of the unknown analyte based at least in part on the one or more characteristics. The determination of such properties of the unknown analyte can be, in such a manner, an indirect measurement of corresponding properties of the sensing film upon analyte adsorption/absorption. In such a manner, the sensor 100 can create a "fingerprint" of the analyte to determine the identity of the analyte. This identity can be stored, transmitted to another party, or alerted to a user of the system 300 to provide real-time chemical sensing information. The method 400 can then terminate after block 440, repeat back to block 410 in continuous operation, or continue on to other method steps not shown.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

EXAMPLES

The following examples are intended solely for explanatory purposes and not limitation.

Example 1

Silicon dioxide can be grown on the n-type epitaxial-layer on top of a p-type substrate. A positive photoresist layer can be patterned on top of the thermal oxide and the oxide can be etched. The opened regions can create windows for boron-doping to form the heating resistors and piezoresistors. The wafer can be dipped in buffered oxide etch (BOE) to strip the borosilicate glass that forms as a result of the doping. A drive-in and thermal oxidation is performed. Positive resist is patterned on top of the wafer and an etch is performed to create contact openings. The wafer can be dipped in BOE and then aluminum can be sputtered onto the wafer surface. The metal can be patterned using dry etching. Alternating layers of plasma enhanced chemical vapor deposition (PECVD) deposited oxide and nitride can be deposited to passivate the metal. A positive photoresist can again be used to pattern the wafer. An etch can be performed through the passivation layer to open up bond pads and define the oxide/nitride layers that will remain on top of the resonators. Alternating layers of oxide and nitride can be deposited and patterned on the wafer backside. The wafer can be etched from the backside using either potassium hydroxide (KOH) with an electrochemical etch stop or using deep reactive oxide etching (DRIE) using the buried oxide (BOX) layer of the SOI wafer as the etch stop. Once the membranes are released a DRIE etch from the topside can be performed to release the cantilevers. This step can be performed prior to the backside etch if an SOI wafer is used.

Figure 5:
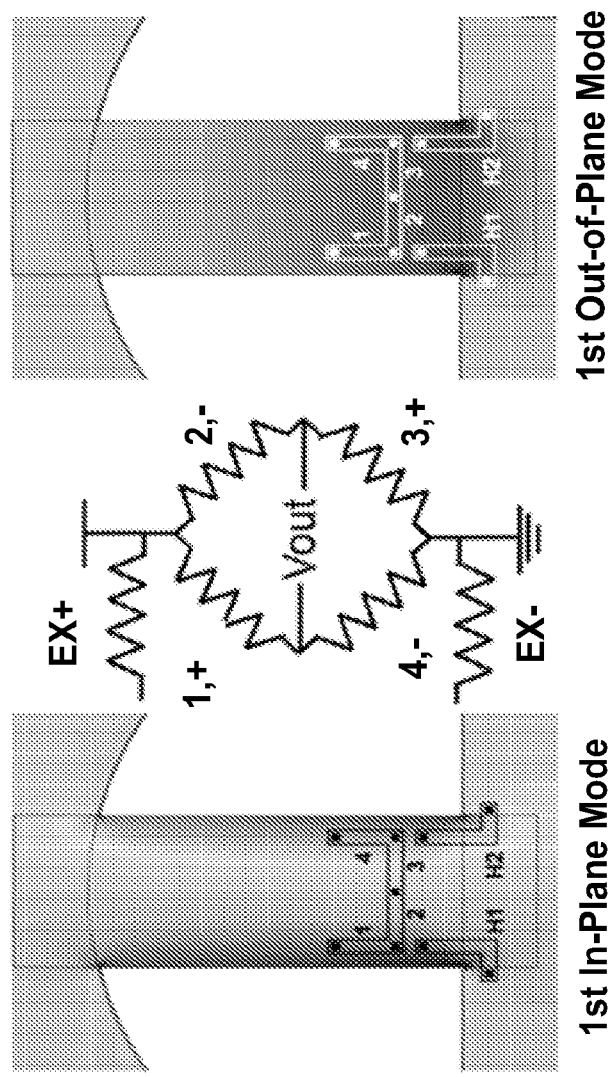
FIG. 5 illustrates a simulated stress distribution diagram for a chemical sensor according to some examples of the present disclosure.

Referring to the Wheatstone bridge in FIG. 5, resistors 1 and 4 can be longitudinal piezoresistors and resistors 2 and 3 can be transverse piezoresistors. Transverse and longitudinal piezoresistors can have opposite signs of their piezoresisitve coefficients. This means for the same mechanical deformation a longitudinal piezoresistor can see the opposite sign of resistance change compared to a transverse piezoresistor. The electrical connections for the resistors are shown in FIG. 5 along with the stress distribution oriented along the length of the beam for the first in-plane resonator mode, the mode where the hammerhead moves back and forth in the plane, and the first out-of-plane bending mode, a mode where the resonator moves up and down. Looking at the first in-plane mode, resistors 1 and 2 can experience a compressive stress, but one is longitudinal, and one is transverse so they will see opposite signs in their resistance change. If we assume resistor 1 sees a positive change in resistance, then resistor 2 will see a negative chance in resistance. Resistors 3 and 4 can both see a tensile stress and again one is a longitudinal resistor and the other is transverse. Thus, resistor 4 can see an opposite sign in the resistance change from resistor 3 and resistor 1 and resistor 3 can see an opposite sign in resistance change from resistor 2. Looking at the signs of the signals, these resistor changes can make the resistances on each half of the Wheatstone Bridge unbalanced giving an output voltage.

Looking at the stress distribution for the first out-of-plane mode, which can be the main resonance mode that requires suppression, all of the resistors experience an identical stress. Thus, resistors 1 and 4 can see a positive chance in resistance and resistors 2 and 3 can see a negative chance in resistance. In this case the bridge can remain balanced because the left two resistors can both see a positive change in resistance, while the right two resistors can both see a negative chance in resistance. Assuming the resistors are the same size, this means that no voltage will be seen at the output of the Wheatstone bridge. The Wheatstone bridge output can be read as a differential signal between the two sides of the bridge.

Figure 6:
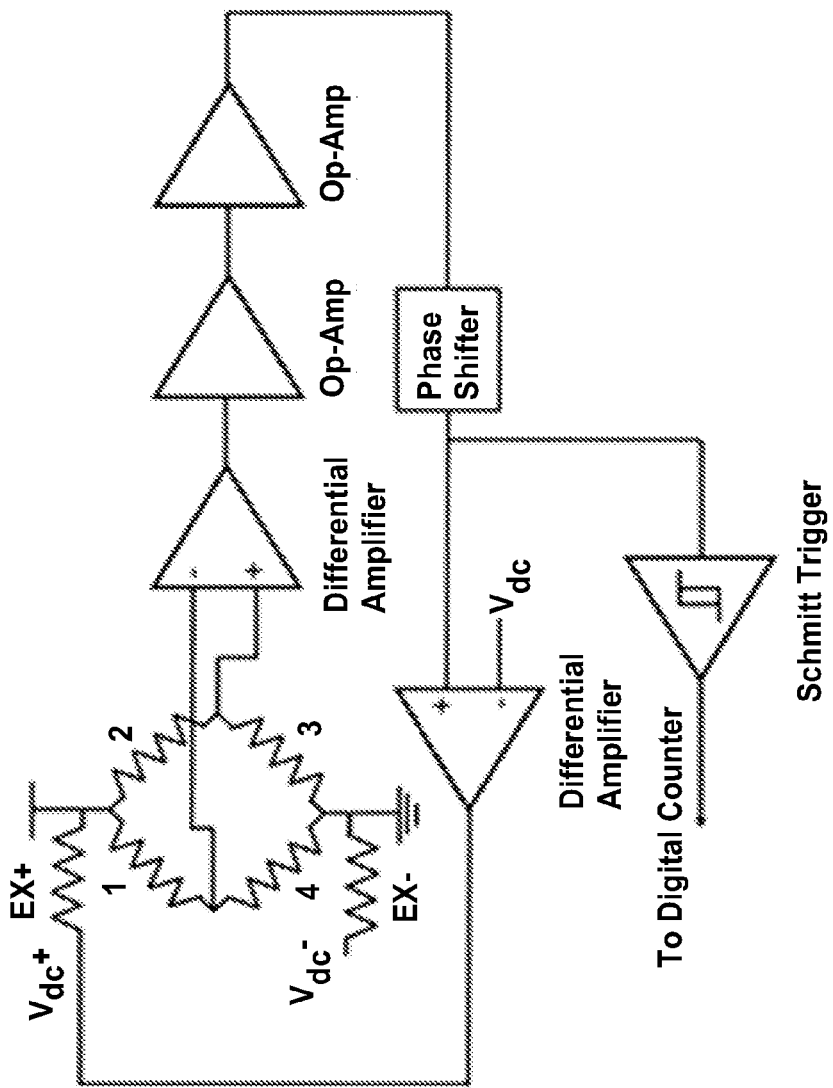
FIG. 6 illustrates a circuit diagram used in a chemical sensing system according to some examples of the present disclosure.

As mentioned above, to obtain self-sustaining oscillations, Barkhausen's criterion can be met, namely 360 degrees of phase-shift around the loop and a gain of 1 can be provided by the combination of the resonator and the closed-loop circuit. FIG. 6 gives an overview of the circuit. The signal from the Wheatstone bridge can be differential, it can be converted into a single ended signal using a differential amplifier, which can also amplify the signal by a factor of 10-20 depending on the specific device being used. The first op-amp can be an inverting amplifier, which again can amplify the signal and the second op-amp can provide additional gain if needed. A phase shifter, consisting of an all-pass filter, can be used to provide additional phase shift to excite the resonator into operation.

There can be two excitation resistors in the resonator circuit, which can be used to heat the edge of the resonator, causing bending of the beam leading to oscillation of the device. One of the heating resistors can be excited with both the AC signal generated by the closed-loop circuit as well as a DC voltage to prevent frequency doubling. The DC voltage can be added to the signal from the closed-loop circuit using a differential amplifier.

The signal generated by the resonator can be a sine wave (as expected from any second order system), but a frequency counter generally can use a square wave to properly measure the signal. The square wave can be generated after the phase-shifter using a Schmitt Trigger.

The frequency counter can be implemented on a system on a chip (SoC) FPGA. The fact that the chip is an SoC means that the FPGA can also contain an integrated microcontroller (MCU) giving it enhanced peripheral functions. The counter design can be based on a reciprocal counter topology. The incoming signal from the counter can be divided down to very low frequency as determined by the gate time (the gate time the interval over which the counter puts out a value). A reference oscillator can generate a signal at much higher frequency than the frequency of the resonator. A digital counter circuit can be used to count the number of reference clock pulses that occur during the time when the divided resonator signal is high, and this represents the course count.

Additional resolution can be achieved by an interpolation method described herein. Phase-locked loop circuits on the FPGA can be used to create phase delays in the references clock. The counter accuracy can be limited by frequency of the reference clock. For example, there is likely, but not necessarily, to be a gap between when the divided resonator signal goes high and when the first reference clock pulse occurs, which can create some uncertainty in the actual frequency. To achieve the needed limits of detection, accurate frequency measurements are needed to a range below 10 millihertz. To achieve this, phase-locked-loop circuits on the FPGA can create multiple phases of the reference clock. A system of AND gates on the FPGA can determine the phase of the reference clock which lies closest to the rising edge of the divided sensor signal created a fine count. The fine count and course count can then be combined to generate a frequency value. This frequency value can be passed from the FPGA to the integrated MCU on the SoC using the internal serial peripheral interface (SPI). Data processing on the MCU can create a single count value based on the fine and course count. This count value can be transferred to the memory chip for storage using the external SPI on the SoC. The stored frequency value on the memory chip can be retrieved by reading them back through the FPGA using the SPI and then the universal asynchronous receive transmitter (UART) to send them to a computer or by removing the memory chip from its holder on the circuit board and plugging it into an appropriate reader on a computer.

Figure 7:
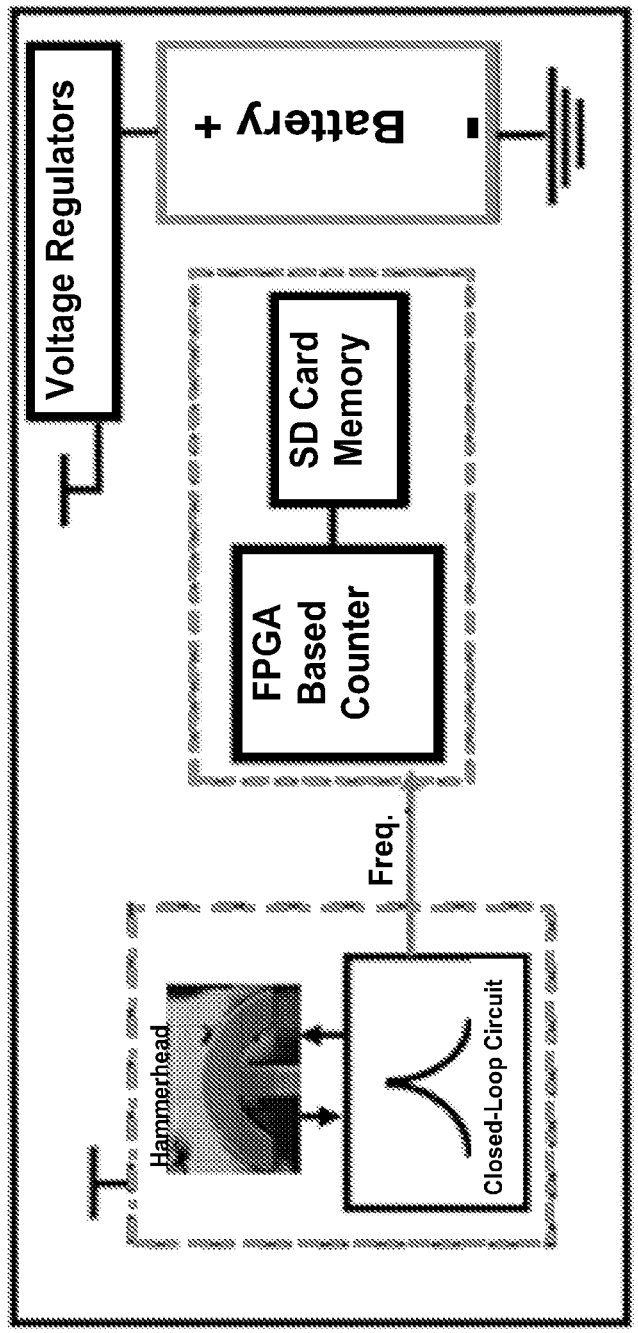
FIG. 7 illustrates a component diagram of a chemical sensing system according to some examples of the present disclosure.

FIG. 7 gives a system overview for the wearable real-time chemical monitor. The system components as described above can include the resonator, the closed loop circuit, an FPGA based counter, a memory chip, and a battery. The system can also contain the necessary support electronics such as voltage regulators. All of the electronics and the resonator itself can be arranged onto a custom designed printed circuit board. The targeted form factor can be roughly that of a uniform pocket. Two AA batteries can be mounted to one side of the board using a battery holder. The resonator itself can be packaged in a 28-pin quad flat (QFN) packaged and mounted the board. A switch can be used to power on the device, and it can begin collecting data when turned on. The counter can log data every second and then send data to a memory card using a microcontroller integrated with the FPGA. The integrated microcontroller as well as the unused gates on the FPGA can be used for additional functions such as real-time data analysis or potentially drift correction.

As described above the sensing system can respond to chemicals by means of a sensitive film deposited on top the resonator itself. The coating can initially be applied using spray coating, but other methods are also possible. In the embedded format the coating can be applied to the resonator before it is wire-bonded into the QFN package. During system operation the resonator can vibrate as a result of excitation from the closed-loop circuit. As the system is exposed the chemicals, the resonator can gain mass as the sensitive coating on its surface absorbs or adsorbs analyte. This can cause the frequency of the resonator to drop. The counter can be continually tracking the frequency of the system while this is happening and logging the data to memory. Once the system has been used for the prescribed measurement time (ultimately limited by the battery life), the memory chip can be plugged into a computer to retrieve the data for analysis.

Example 2

The fabrication process can begin with growing a 1.1 µm thick thermal oxide on a silicon-on-insulator (SOI) wafer with a 600 µm handle layer, a 2 µm buried oxide (BOX) layer, and a 26 µm n-type device layer. The thermal oxide can be patterned using the diffusion mask and etched using an ICP (inductively coupled plasma) process. Boron pre-deposition can be carried out for 40 minutes at 930° C. using solid boron diffusion sources. After removing the borosilicate glass with a buffered oxide etch (BOE) dip, resistor drive-in can be performed together with a wet thermal oxidation at 950° C. for 30 minutes, followed by a dry oxidation at 1000° C. for 30 minutes. The resulting p-type resistors can have a junction depth of approximately 1 µm. Next, contacts can be opened to the diffused resistors using a second pattern and etching sequence. Subsequently, 750 nm of a 99%/1% aluminum/copper alloy can be deposited via sputtering. The metal can then be patterned by a $BCl_3$-based dry etching step. A top-side passivation layer stack of 0.8/0.4 µm $SiN_x/SiO_2$ can then be deposited via plasma-enhanced chemical vapor deposition (PECVD). The particular layer thicknesses can be chosen to reduce the stress in the stack. An additional 3 µm of PECVD $SiO_2$ can be deposited on the backside of the SOI wafer (on top of 2 µm of thermally grown oxide), such that the total thickness of the backside silicon oxide mask is 5 µm.

The gold metallization for the interdigitated electrodes can be achieved using a lift-off process. After patterning a photoresist (Microposit SC1813) film, a 15/150 nm stack of Cr/Au can be deposited via a e-beam evaporation and subsequently lifted off. Next, the topside device layer can be structured by first ICP etching the topside passivation stack and then DRIE (deep reactive ion etching) etching the 26 µm device layer using the Bosch process. Subsequently, the backside release can be performed by first ICP etching the backside passivation stack and then performing a through-wafer DRIE etch using the Bosch process. Finally, the buried oxide can be etched to release the devices using the same ICP process as the previous oxide etchings. After the bulk micromachining processes to release the MEMS sensors, the wafer can be diced using a dicing saw with the water pressure set to its lowest possible value to avoid breaking the already released devices.

After dicing, a 2% by weight solution of poly(epichorohydrin) (PECH) in toluene can be spray-coated using a Badger 200 airbrush and shadow mask, resulting in an approximately 2-3 µm thick sensing film on the head region only. The shadow mask can be machined using an OPTEC Femtosecond Laser Micromachining System and aligned manually using a custom-made alignment platform. The devices can be wire bonded to 28-pin dual-in-line (DIL) packages. Each die can possess eight individually addressable multisensors, with four devices being bonded at any one time to the 28-pin package.

Two separate circuits can be used to read out the in-plane resonance frequency and capacitance of the multisensor. For closed-loop resonant operation, the mass-sensitive sensor can be embedded in an amplifying feedback loop. The frequency signal can be fed into a bench-top frequency counter that interfaces with a LabView program to collect and store the frequency data. Simultaneously, the capacitive signal can be monitored via a precision LCR meter with a 2V signal level and 1 MHz test frequency. Special care can be taken to minimize interference between the closed-loop circuit used to sustain the in-plane resonance and the capacitive readout circuit.

Gas measurements can be performed using a custom gas-setup. The system can use a nitrogen carrier gas that flows through a temperature-controlled bubbler containing the liquid form of the analyte of interest in order to obtain a known saturated vapor pressure of the desired analyte. This stream can be further diluted with a secondary nitrogen line to control the final partial pressure of the analyte. A total flow rate of 80 mL/min can be used, and a LabView control system can allow for concentrations to be selected by controlling the flow rates of the lines via mass flow controllers. For purging, a four-way solenoid valve can be used to switch to a third line of nitrogen kept at 80 mL/min to avoid injection of any residual analyte in the lines during purging. In a single measurement, the multisensor can be exposed to increasing and decreasing analyte concentrations, with each five-minute analyte exposure followed by a five-minute purge step using nitrogen.

Figure 8A:
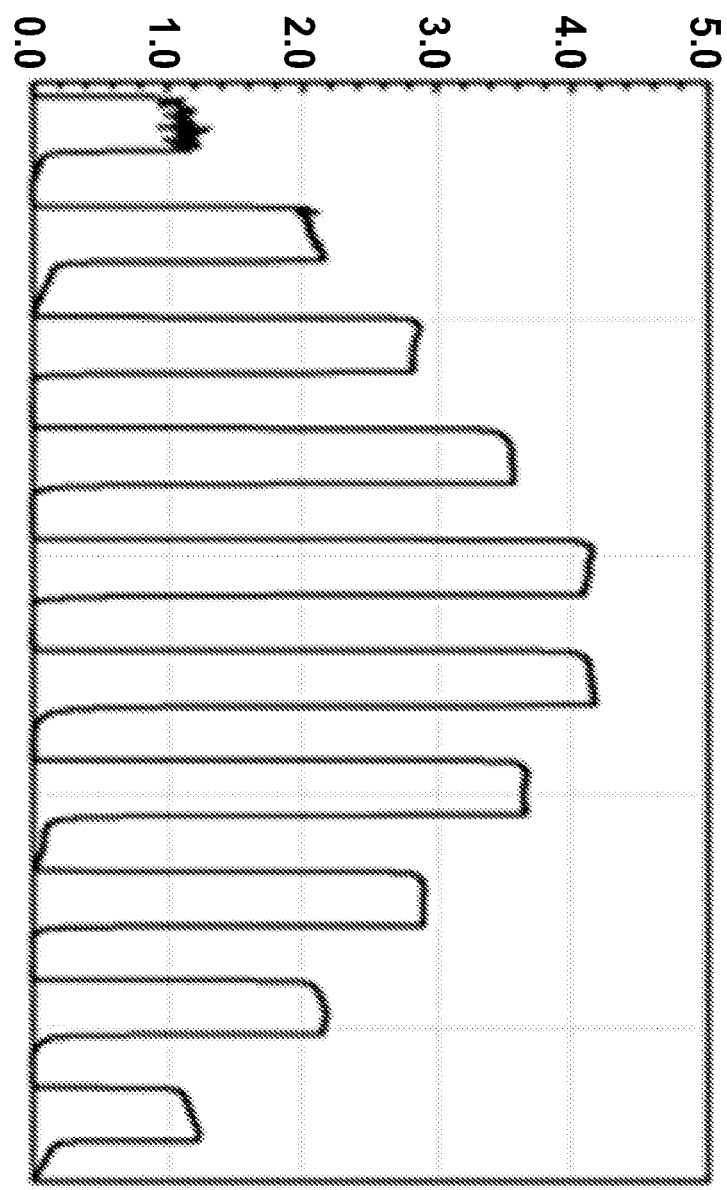
FIG. 8A is a chart illustrating the relative capacitance change over time for a chemical sensor according to some examples of the present disclosure.
Figure 8B:
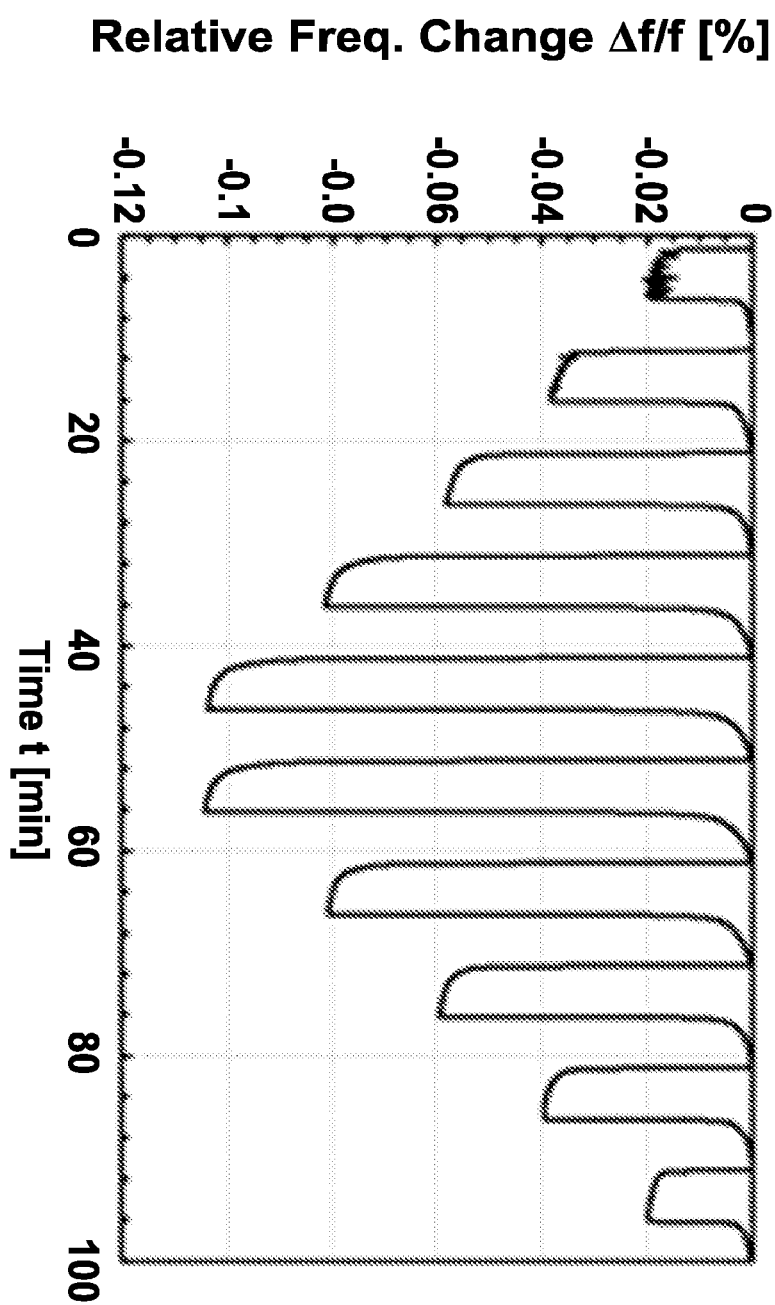
FIG. 8B is a chart illustrating the relative resonant frequency change over time for a chemical sensor according to some examples of the present disclosure.
Figure 9A:
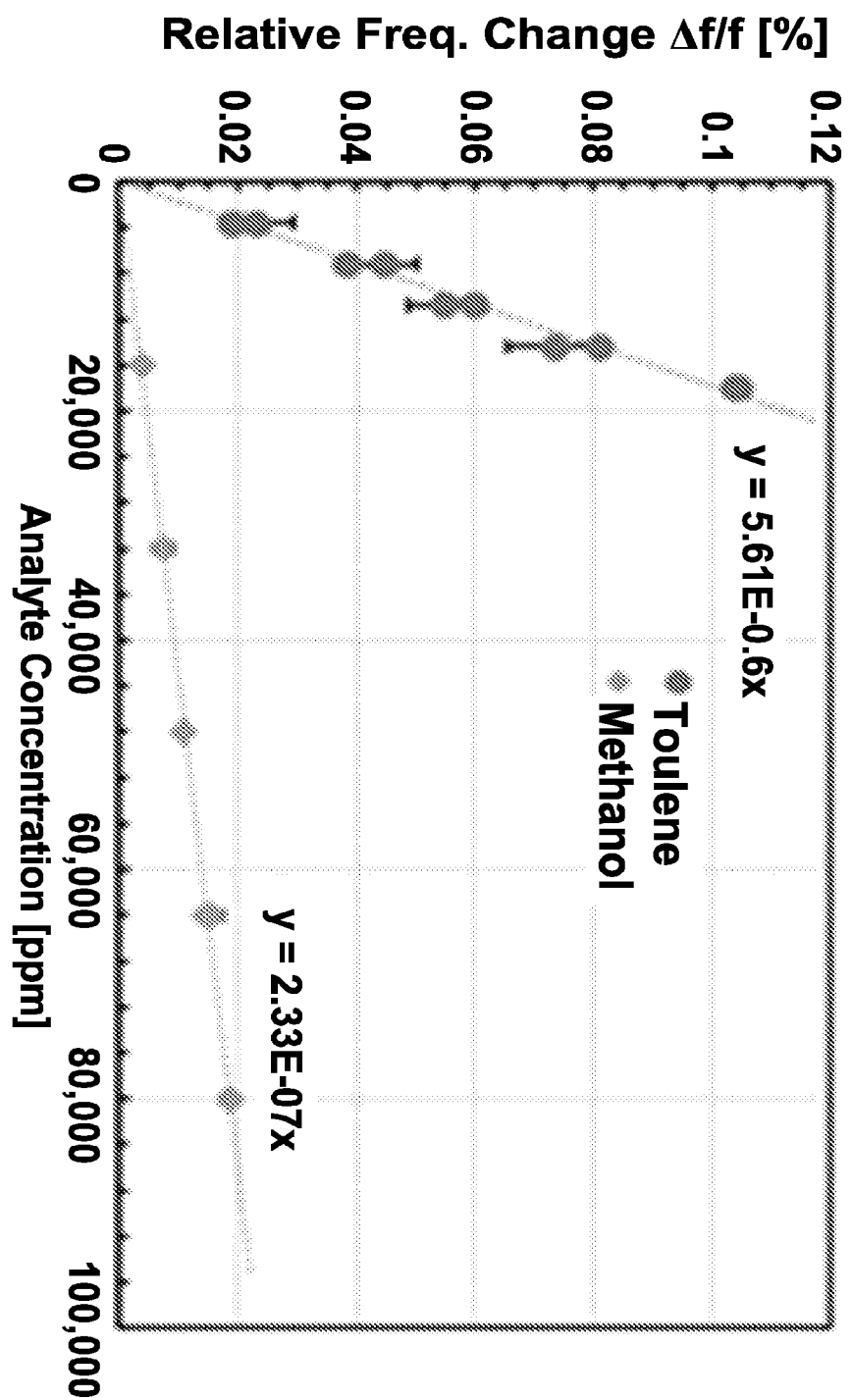
FIG. 9A is a chart illustrating the relative capacitance change as a function of analyte concentration for a chemical sensor according to some examples of the present disclosure.
Figure 9B:
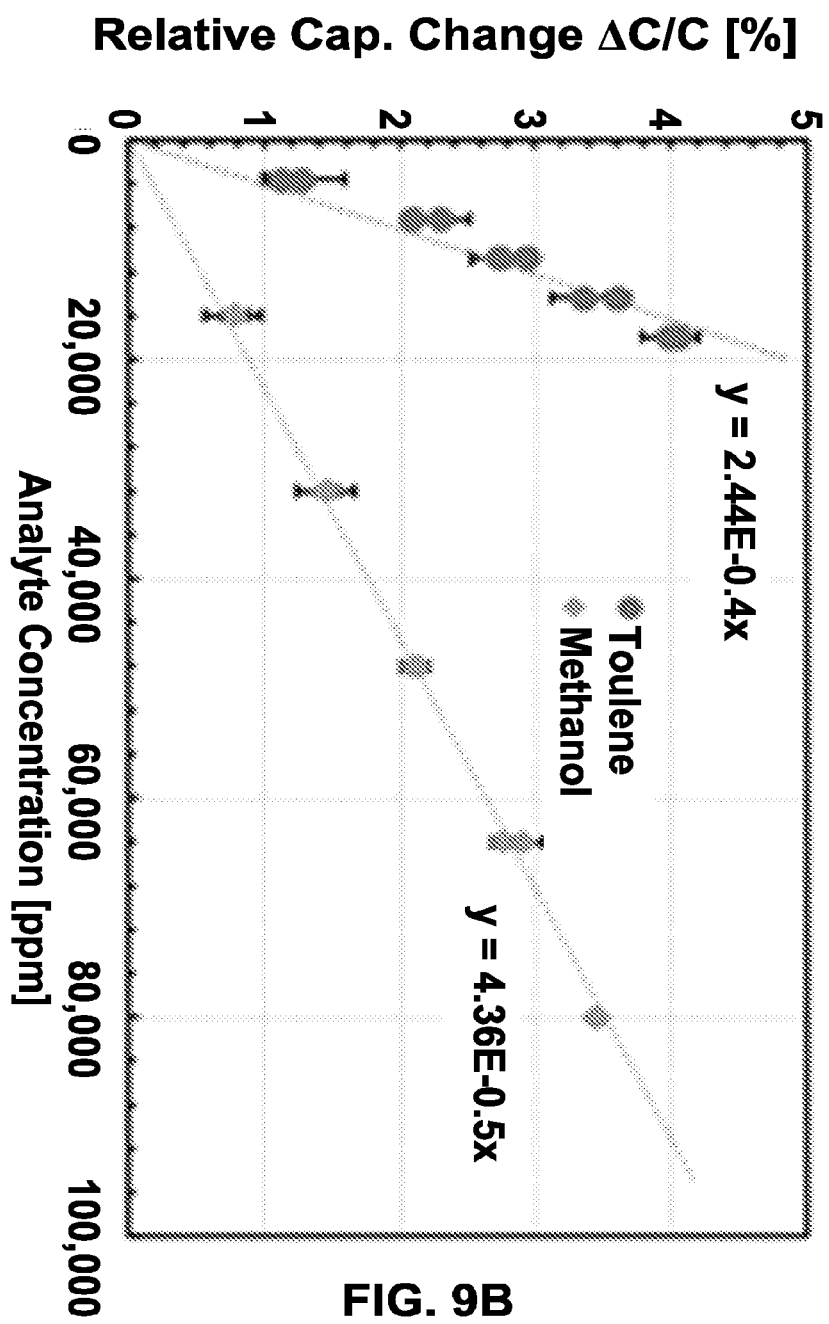
FIG. 9B is a chart illustrating the relative resonant frequency change as a function of analyte concentration for a chemical sensor according to some examples of the present disclosure.

FIGS. 8A and 8B show a characteristic response of the PECH-coated multisensor to changing concentrations of toluene. While the mass-sensitive sensor shows a frequency decrease (FIG. 8B) upon analyte absorption into the PECH sensing film, the capacitive sensor records a capacitance increase (FIG. 8A). Five of these measurements were taken for both methanol and toluene. From these measurements, the steady-state relative frequency and capacitance changes were extracted, and the mean values were plotted as a function of analyte concentration in FIGS. 9A and 9B, with their respective standard deviation shown as error bars.

As expected, the resonance frequency changes are negative, indicating analyte uptake into the PECH sensing film, and the mass-sensitivity for toluene is much higher than that for methanol, because of the higher partition coefficient for toluene in PECH and the higher molecular weight of toluene (92.14 g/mol) compared to methanol (32.04 g/mol). Normalizing the measured mass-sensitivities by the analyte molecular weight, the ratio of the toluene-to-methanol partition coefficients is approximately 8.4:1. Using the measured short-term frequency stability of 3.3 mHz for the coated resonant microsensor, the limit of detection for toluene and methanol are extrapolated as 530 ppb and 13.2 ppm, respectively.

Additionally, the relative capacitance changes are positive for both toluene and methanol. Considering the dielectric constants for toluene (2.38) and methanol (32.7) compared to that of PECH (7.5), a person of ordinary skill in the art could have expected a negative capacitance change for toluene. However, for films that are thin compared to the electrode spacing, film swelling, which always leads to a positive capacitance change, can be considered in addition to the change of the effective dielectric constant, likely yielding the positive capacitance change for toluene in this case. Without wishing to be bound by any particular scientific theory, the fact that the capacitance change for toluene is larger than that for methanol can be explained by the larger partition coefficient and the likely larger swelling because of the larger molecule size.

Figure 10:
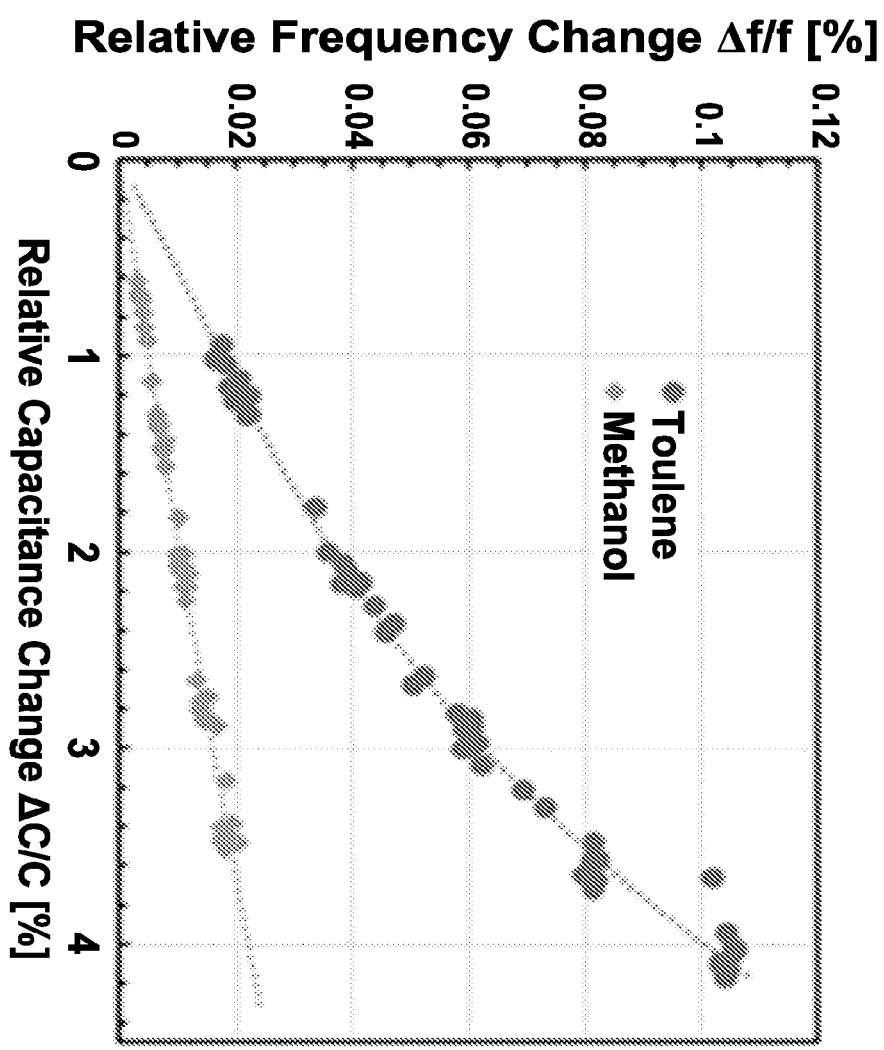
FIG. 10 is a chart illustrating the relative resonant frequency change plotted against the relative capacitance change for a chemical sensor according to some examples of the present disclosure.

FIGS. 8A-B and 9A-B also highlight the linearity and minimal hysteresis of both sensing principles in the range of investigated concentrations. However, without a prior knowledge of concentration and/or gases present, it would be difficult to distinguish between the two analytes using a single transducer if only steady-state signals are evaluated, even with proper calibration. The multisensor improves analyte discrimination (i.e., the sensor selectivity), as is highlighted in FIG. 10, which plots the measured relative frequency shift versus the measured relative capacitance change for all steady-state data points (5 nominal analyte concentrations with 10 measurements each) for both toluene and methanol. Without wishing to be bound by any particular scientific theory, the fact that both analytes follow distinct relationships can indicate that the ratio of the sensor signals, i.e. the ratio of the mass-to-capacitance response (the slope in FIG. 10), can be used to distinguish between toluene and methanol. Without wishing to be bound by any particular scientific theory, the toluene relationship can be non-linear in FIG. 10 due to a non-linear increase of its capacitance change with concentration.

Example 3

In the above examples, the steady-state and transient responses have been characterized for polymer-coated gravimetric resonant devices and for polymer-coated chemocapacitive sensors; both sensor types demonstrate remarkable sensitivity to a wide variety of VOCs. However, in both cases, the selectivity of these sensors is limited for a single sensing film-transducer pair, because of the partial selectivity of the polymer coating itself. In univariate sensors, selectivity is often derived from the variation in sensitivities for each analyte which is a function of concentration. Thus, quantification can only be performed in the case where the gases present are known a-priori. This is undesirable for many applications as there is often a need to quantify not only how much of something is in the air (quantification), but also what is in the air (speciation). To overcome the sensing-film based selectivity limitation, multivariate sensing in which a single sensor produces multiple outputs can be leveraged. A comprehensive review of multivariate gas sensors and the many combinations of transducers and signal types utilized can be found below.

For a multivariate sensor with multiple outputs, with the sensor responses depending on the partition coefficient to varying degrees or a product of multiple material property relationships, additional selectivity can be derived by comparing variations in these relations. This is often visualized using a multi-dimensional dispersion in which data is plotted as a function of the sensor outputs rather than gas concentration and has been demonstrated for the multivariate sensor used here. However, this previous method considers only a comparison of the steady state data. In the present disclosure, it is investigated if such variations hold true for transient characteristics of the sensor responses as well and if these variations are distinct from steady-state selectivity.

The multivariate sensor builds on an established hammerhead-shaped resonator platform disclosed herein, consisting of a semicircular annulus of 100/200 µm inner/outer radius supported by a 100 µm long and 45 µm wide cantilever beam. An interdigitated electrode (IDE) structure is overlayed on the surface of the device, enabling multivariate sensing using a single polymeric film (FIG. 1). In this IDE structure both the electrode width and edge-to-edge spacing can be 2 µm. The resonator-based gravimetric sensor can utilize thermal excitation and piezoresistive sensing and is operated at its in-plane resonance mode using a closed-loop circuit, with the frequency being read out by a frequency counter. The capacitance of the IDE can be simultaneously monitored using a high-precision LCR meter. For the present disclosure, an approximately 2 µm sensing film of polyepichlorohydrin (PECH) can be deposited on the annulus region of the device via spray coating with a shadow mask.

The device can be tested utilizing a custom-built gas measurement setup described herein. This measurement setup can enable in-flow gas testing of chemical sensor devices with automated concentration ramping and exposure/purge cycling capabilities. Analyte concentration generation can be performed using a temperature-controlled bubbler-vaporizer setup in which the saturated partial pressure of the target VOC is generated and then diluted through the control of flow rates in the system's gas lines via multiple mass flow controllers. Exposure/purge cycling can be performed through the use of a 4-way solenoid valve enabling rapid transition between the analyte-filled exposure line and a purging line of pure carrier gas. The use of the solenoid valve and minimal headspace of the flow cell can enable near ideal concentration stepping, minimizing systemic error in the transient response characteristic.

Each gas can be tested at five concentrations utilizing the bubbler-based gas measurement setup. For each analyte gas, the sensor can be subsequently exposed to multiple cycles of increasing and decreasing analyte concentrations, with each 5-minutes analyte exposure followed by a corresponding purge of similar length using UHP nitrogen. The data highlights the repeatability of the sensor response, as well as the characteristic diffusion-limited response patterns for the different analytes. It should be noted that while the transient responses herein can be created using the test setup, similar transients can be generated by rapidly heating/cooling the sensor.

In the present disclosure, the T90 response time, defined by the time it takes to reach 90% of the steady-state response, has been explored as it had been identified before as a useful metric to improve gas discrimination in polymer-based impedimetric sensors. For this data set the last available datapoint at the end of the five-minute period can be used in place of saturation limit as some gases do no reach full saturation of their gravimetric response within the five-minute period. The response time for a particular analyte can depend on the analyte concentration, as noted previously for gas sensors utilizing polymeric films. The data can be fit with a second-order polynomial demonstrating the quadratic dependence of the T90 response time on analyte concentration. There is both noticeable separation of analytes based on their transient response time and noticeable variation in their concentration dependence. This separation provides a means of selectivity and gas identification if the concentration is known.

Although the present example relates to the time it takes to reach 90% of the steady-state response, the disclosed selectivity and gas identification can be determined from the transient response at shorter transient response times, such as at 10%, 20%, 30%, 40%, 50%, 60%, 63%, 70%, or 80% of the transient response time.

For the steady-state dispersion, the aromatics and alcohols can be well separated at high concentrations, but the discriminatory power of this dispersion fades as the analyte concentration approaches zero. This limitation was not observed for the 2D dispersion of the transient response times as all five gases are spatially separated, and their intercepts do not converge to zero. In particular, it was observed that, for the aromatics, the capacitive response can be faster than the gravimetric/frequency response, while this behavior can be reversed for the alcohols. Thus, both 2D dispersions can provide discrimination of the five gases with separation/clustering of the aromatic and alcohols.

The transient responses of both transduction mechanisms can be based on diffusion. Thereby, the gravimetric response can be directly related to the fractional mass uptake due to analyte diffusion into the sensing film, while the capacitive response can be composed of contributions from both dielectric property changes of the sensing film due to incorporation of polarizable analyte into the polymer matrix and the swelling of the polymer. Moreover, local dielectric property changes due to analyte diffusion into the sensing film can create a spatially varying contribution to the sensor's capacitive response due to the fact that the fringing of the electric field in the IDE creates non-uniform field density which can be largest close to the electrode edges. Swelling-based contributions to the capacitive response are mainly due to the increase in the sensing film height which causes the volumetric replacement of air with its lower dielectric constant with sensing film with higher dielectric constant. It has been shown that 95% of all electric field lines of an IDE-based capacitor can be contained within ½ the periodicity of the electrodes; for the IDE in the present disclosure, this critical thickness can be 4 µm. Importantly, swelling may only important for thin sensing films, i.e., sensing film thicknesses smaller than this critical thickness, as is the case herein.

The gravimetric sensor can detect a mass change as soon as the analyte molecule enters the sensing film. In contrast, the capacitive response contribution due to the dielectric constant change of an analyte molecule can increase as the analyte diffuses deeper into the sensing film due to the non-uniform electric field distribution. As a result, without wishing to be bound by any particular scientific theory, the capacitive response due dielectric property changes should be slower than the gravimetric response. How can the present example then explain the observed faster capacitive response in case of the aromatics? Without wishing to be bound by any particular scientific theory, it is believed that the swelling-based contributions to the capacitive response provide a means for the transient response to be "front-loaded": the initial sensing film surface is closer to the electrodes and is pushed further away into lower electric field regions due to swelling. Thus, the swelling-based component to the capacitive signal can be strongest at the beginning of the analyte diffusion. If this swelling-based contribution to the capacitive sensitivity dominates the capacitive response, like in the case of the aromatics, then it is possible for the capacitive response to respond faster than its gravimetric counterpart.

The implications of this are three-fold. First, for capacitive sensors with thin polymer coatings three components can contribute to the capacitive sensitivity of the device, yielding three sources for selectivity: (1) the partition coefficient, (2) the relationship of the dielectric constants of the sensing film-analyte pair, (3) the effects of the analyte-dependent swelling behavior. The second implication is that the enhanced selectivity due to the multivariate sensor does not come at the expense of additional sensor response time. In fact, the enhanced selectivity should be more pronounced for thinner sensing films where all above components contribute to the sensor response. The third implication is that the thickness of the polymer film can be used as an additional mechanism to tune the variation in multivariate responses and, thus, the discriminatory performance.

Through the use of a novel micromachined multivariate sensor with a single polymeric sensing film, the transient behavior of gravimetric and capacitive sensor responses can be investigated. Comparison of the transient sensor responses in 2D dispersion can show enhanced discriminatory ability compared to steady-state response alone, as the discriminatory power of the steady-state dispersion can be concentration dependent while the transient response time dispersion is not. Observations of a counter-intuitive "front-loaded" transient behavior in which the capacitive response time was faster than the gravimetric response times for aromatics can be noted and investigated within the framework of the disclosed mechanisms. The mechanism for this response time enhancement can be the result of swelling-induced changes in the capacitive response due to the use of a thin sensing film. Furthermore, the present disclosure highlights the ability of the multisensor to enhance selectivity not only through use of the steady-state dispersions but also transient response time dispersions at no additional cost to the sensor designer. Finally, the present disclosure may pave the way for future work targeting enhanced selectivity mechanisms with drastically improving sensor response times, which is a critical for monitoring VOCs in industrial environments and closed operational settings.

What is claimed is:

1. A method of detecting an unknown analyte, the method comprising:
    contacting the unknown analyte with a sensor in communication with a circuit and a microcontroller;
    adsorbing or absorbing the unknown analyte on the sensor to cause (i) a change in a gravimetric property of the sensor and (ii) a change in an impedimetric property of the sensor;
    generating, in response to the change in the gravimetric property and the change in the impedimetric property, a transient response time defined by a time taken the sensor to achieve 90% of a steady-state response, the transient response time indicative of one or more characteristics of the unknown analyte; and
    determining a chemical composition and a concentration of the unknown analyte based on the one or more characteristics.

2. The method of claim 1, wherein the sensor comprises a microelectromechanical system (MEMS) resonator and a sensing film configured to adsorb or absorb the analyte, the sensing film coating at least a portion of the sensor.

3. The method of claim 2, wherein the MEMS resonator comprises a silicon substrate layer, a silicon oxide layer disposed on the substrate layer, a resistor layer diffused into the substrate layer, and a passivation layer coating the silicon oxide layer, the substrate layer, and the resistor layer.

4. The method of claim 3, wherein the MEMS resonator comprises:
    a semicircular annulus coated with the sensing film; and
    a cantilever stem supporting the semicircular annulus, the cantilever stem in communication with the circuit.

5. The method of claim 1, wherein the change in the gravimetric property is a change in a mass of the sensor as a result of adsorption or absorption of the analyte and the change in the impedimetric property is a change in a dielectric constant of the sensor as a result of adsorption or absorption of the analyte.

6. The method of claim 1, wherein the circuit comprises an oscillator circuit feedback loop configured to operate the sensor.

7. The method of claim 6, wherein the oscillator circuit feedback loop comprises an operational amplifier, a differential amplifier, and a phase shifter.

8. The method of claim 7, wherein the microcontroller includes a field programmable gate array (FPGA) emulating a digital counter in communication with the circuit.

9. The method of claim 1, wherein the sensor further comprises a wearable housing configured to contain the sensor, the circuit, and the microcontroller, the wearable housing configured to attach to an article of clothing.

10. A method of detecting an unknown analyte, the method comprising:
    contacting the unknown analyte with a sensor in communication with a circuit and a microcontroller;
    adsorbing or absorbing the unknown analyte on the sensor to cause (i) a change in a gravimetric property of the sensor and (ii) a change in an impedimetric property of the sensor;
    generating, in response to the change in the gravimetric property and the change in the impedimetric property, a real-time steady-state signal using the microcontroller, the real-time signal indicative of a first characteristic of the unknown analyte;
    generating, in response to the change in the gravimetric property and the change in the impedimetric property, a transient response time defined by a time taken the sensor to achieve 90% of the real-time steady-state signal, the transient response time indicative of a second characteristic of the unknown analyte; and
    determining a chemical composition and a concentration of the unknown analyte based on the first characteristic and the second characteristic.

11. The method of claim 10, wherein the sensor comprises a microelectromechanical system (MEMS) resonator and a sensing film configured to adsorb or absorb the analyte, the sensing film coating at least a portion of the sensor.

12. The method of claim 11, wherein the MEMS resonator comprises a silicon substrate layer, a silicon oxide layer disposed on the substrate layer, a resistor layer diffused into the substrate layer, and a passivation layer coating the silicon oxide layer, the substrate layer, and the resistor layer.

13. The method of claim 10, wherein the change in the gravimetric property is a change in a mass of the sensor as a result of adsorption or absorption of the analyte and the change in the impedimetric property is a change in a dielectric constant of the sensor as a result of adsorption or absorption of the analyte.

14. The method of claim 10, wherein the sensor further comprises a wearable housing configured to contain the sensor, the circuit, and the microcontroller, the wearable housing configured to attach to an article of clothing.

15. A method of detecting an unknown analyte, the method comprising:
   contacting the unknown analyte with a sensor in communication with a circuit and a microcontroller;
   adsorbing or absorbing the unknown analyte on the sensor to cause a change in capacitance of the sensor due at least in part to swelling of the sensor due to contact with the unknown analyte;
   generating, in response to the change in the capacitance of the sensor, a transient response time defined by a time taken the sensor to achieve 90% of a steady-state response, the transient response time indicative of one or more characteristics of the unknown analyte; and
   determining a chemical composition and a concentration of the unknown analyte based on the one or more characteristics.

16. The method of claim 15, wherein the sensor comprises a microelectromechanical system (MEMS) resonator and a sensing film configured to adsorb or absorb the analyte, the sensing film coating at least a portion of the sensor.

17. The method of claim 16, wherein the MEMS resonator comprises a silicon substrate layer, a silicon oxide layer disposed on the substrate layer, a resistor layer diffused into the substrate layer, and a passivation layer coating the silicon oxide layer, the substrate layer, and the resistor layer.

18. The method of claim 17, wherein the MEMS resonator comprises:
   a semicircular annulus coated with the sensing film; and
   a cantilever stem supporting the semicircular annulus, the cantilever stem in communication with the circuit.

19. The method of claim 15, wherein the change in capacitance is a change in a dielectric constant of the sensor as a result of adsorption or absorption of the analyte.

20. The method of claim 15, wherein the sensor further comprises a wearable housing configured to contain the sensor, the circuit, and the microcontroller, the wearable housing configured to attach to an article of clothing.

* * * * *